United States Patent Office

2,882,415
Patented Apr. 14, 1959

2,882,415

RADIATION DOSIMETER COLOR STANDARD

Jean P. Pressau, Bairdford, Pa., assignor to Callery Chemical Company, Pittsburgh, Pa., a corporation of Pennsylvania No Drawing. Application October 28, 1953
Serial No. 388,924

6 Claims. (Cl. 250—83)

This invention relates to dosimeter color standards adapted to indicate accumulated, or total, exposure to gamma radiation.

The invention is concerned especially with dosimeters of the type having an alkali halide element sensitized to gamma radiation. Such sensitive elements undergo color change upon exposure to gamma radiation, and the extent of the color change is progressively greater with progressive exposure. A common type of such element is an alkali metal halide crystal containing an alkali metal halide, usually potassium bromide (KBr) containing potassium hydride (KH). The dosimeter customarily comprises the sensitive element and at least one color standard, the color of which corresponds to the color the sensitive element will show after exposure to a predetermined amount of radiation, say 100 roentgen (100 r.). Commonly more than one color standard is used, for example two that correspond respectively to exposures of 100 r. and 300 r. The sensitive element and standard, or standards, are mounted in a case to be viewed by reflected light.

It has been proposed heretofore to make such color standards from synthetic resins colored appropriately by means of dyes. Experience has shown that it is difficult to develop in this way the exact shade corresponding to the color of a given sensitive element after exposure to a predetermined amount, say 100 r. of radiation.

It is among the objects of this invention to provide a method of preparing radiation dosimeter color standards that is simple, inexpensive, easily and rapidly practiced, and is adapted to provide color standards of accurately determined color representative of a predetermined amount of radiation.

Yet another object is to provide color standards for radiation dosimeters that are inexpensive, easily produced from readily available materials, and afford accurate standards for the measurement of total exposure to radiation as represented by a given radiation sensitive element.

The color standards contemplated by the present invention are shapes made from clear, i.e., colorless and transparent, materials such as glass but preferably from synthetic resins. The material used is, of course, insensitive to radiation. In accordance with the invention the surfaces of the shape, except for the viewing surface, are provided with a coating of paint, or other film-forming material, having as its only appreciable absorption band in the visible spectrum a strong absorption maximum that corresponds to the absorption spectrum that will be shown by the sensitive element after exposure to a predetermined amount of radiation. For example, if the standard is to represent exposure to 100 r., the paint applied to the color standard will have a maximum absorption in the visible spectrum the same as, or close to, the absorption spectrum of the sensitive element after exposure to 100 r. of gamma radiation. In other words, the paint is of such absorption characteristics that when the standard is viewed by looking down into it through the viewing surface the light reflected from the paint matches the color the sensitive element will show after exposure to the predetermined amount of radiation.

Most suitably, the synthetic resin, or other material, used for making the standard, has an index of refraction as close as possible to that of the sensitive element.

As an example, color standard shapes may be made from a partially polymerized glycol alkyd copolymer with styrene sold by the Pittsburgh Plate Glass Company, of Pittsburgh, Pennsylvania, as "Selectron 5026" resin. Shapes of appropriate size and dimensions are molded from the resin after the addition of a suitable catalyst, say 0.5 percent by weight of t-butyl hydroperoxide, and oven heating at 200° C. for one hour. Most suitably, the viewing surface is molded against glass. This type of resin is especially desirable for these purposes because it is possible to make shapes that are free from bubbles and other defects that would adversely affect the optical properties of the shape.

To make a 100 r. color standard from such shapes in accordance with the invention for use with KBr—KH radiation sensitive elements, all of the surfaces of the shape, except for the viewing surface, are coated with a blue paint having a strong absorption maximum at 625 millimicrons, and no other absorption bands, or at least only weak ones, at other wave lengths in the visible spectrum. Although various paint or film-forming pigment or dye combinations might be used for this purpose, I find that one especially adapted for the production of this specific radiation standard for use with KBr—KH elements is a material sold by the Pittsburgh Plate Glass Company, aforesaid, as "Selectron 5571."

For most purposes it is preferable to abrade the surfaces of the shape that are to be coated, as by means of sand paper, prior to applying the color and film. In general also it is desirable to mix the color, or paint, with a quantity of a diffuse deflecting white paint or pigment such as magnesium oxide or titanium oxide paint.

For the development of color standards representative of other amounts of radiation or for use with radiation sensitive elements other than KBr—KH, which show different color changes, the film-forming material used will, as described above, possess the absorption maximum, with substantially absence of other absorption bands in the visible spectrum, representative of the color developed by the sensitive element after exposure to the predetermined amount of radiation. In general, the reflectance spectrum of the film-forming material should match the absorption spectrum of the exposed crystal when the total radiation it has received reaches the monitoring amount.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of making for a radiation dosimeter having an alkali halide element sensitized to radiation, a color standard adapted to be viewed by reflected light, comprising abrading the surfaces, except for the viewing surface, of a shape of material of the group consisting of clear transparent resin and glass substantially insensitive to radiation, and coating all but the viewing surface of said shape with a film-forming composition having as its only appreciable absorption band in the visible spectrum a strong absorption maximum corresponding to the color shown by said sensitive element after exposure to a predetermined amount of radiation.

2. A color standard adapted to be viewed by reflected light for a radiation dosimeter having an alkali halide element sensitized to radiation comprising a shape of material of the group consisting of clear transparent resin and glass substantially insensitive to radiation, and a coating on all but the viewing surface of said shape of a film-forming composition having as its only appreciable absorption band in the visible spectrum a strong absorption maximum corresponding to the color shown by said sensitive element after exposure to a predetermined amount of radiation.

3. A color standard adapted to be viewed by reflected light for a radiation dosimeter having an alkali halide element sensitized to radiation comprising a shape of material of the group consisting of clear transparent resin and glass substantially insensitive to radiation and having an index of refraction substantially that of said element, and a coating on all but the viewing surface of said shape of a film-forming composition having as its only appreciable absorption band in the visible spectrum a strong absorption maximum corresponding to the color shown by said sensitive element after exposure to a predetermined amount of radiation.

4. A color standard according to claim 3 matching the 100 r color of a KBr—KH sensitive element, said composition having said maximum at 625 millimicrons.

5. A color standard according to claim 4, said shape consisting of polymerized glycol alkyd copolymer with styrene.

6. A color standard adapted to be viewed by reflected light for a radiation dosimeter having an alkali halide element sensitized to radiation comprising a shape of material of the group consisting of clear transparent resin and glass substantially insensitive to radiation and having an index of refraction substantially that of said element, and a coating on all but the viewing surface of said shape with a film-forming composition having a reflectance spectrum matching the absorption spectrum of said element after exposure to a predetermined amount of radiation.

References Cited in the file of this patent

UNITED STATES PATENTS

| | | |
|---|---|---|
| 2,238,674 | Battle | Apr. 15, 1941 |
| 2,240,053 | Richardson | Apr. 29, 1941 |
| 2,490,263 | Gaiser | Dec. 6, 1949 |
| 2,673,934 | Friedman | Mar. 30, 1954 |
| 2,680,816 | Stern | June 8, 1954 |
| 2,721,809 | Marks | Oct. 25, 1955 |

OTHER REFERENCES

"Tailor-made Polyester Resin from Modern Plastics," October 1947, pages 111–115.